United States Patent [19]

Gusefski et al.

[11] Patent Number: 5,202,972
[45] Date of Patent: Apr. 13, 1993

[54] STORE BUFFER APPARATUS IN A MULTIPROCESSOR SYSTEM

[75] Inventors: Richard J. Gusefski, Endicott; Chon I. Lei, Endwell; Alfonso Ramirez, Endicott, all of N.Y.

[73] Assignee: International Business Machines Corporation, Armonk, N.Y.

[21] Appl. No.: 725,919

[22] Filed: Jul. 3, 1991

Related U.S. Application Data

[63] Continuation of Ser. No. 291,805, Dec. 29, 1988, abandoned.

[51] Int. Cl.$^5$ .................. G06F 13/00; G06F 9/00; G06F 15/16
[52] U.S. Cl. .................. 395/425; 364/964.2; 364/243.4
[58] Field of Search ............ 395/425; 364/DIG. 1, 364/DIG. 2

[56] References Cited

U.S. PATENT DOCUMENTS

| | | | |
|---|---|---|---|
| 3,735,360 | 5/1973 | Anderson et al. | 364/200 |
| 3,845,474 | 10/1974 | Lange et al. | 364/200 |
| 3,896,419 | 7/1975 | Lange et al. | 340/172.5 |
| 3,938,097 | 2/1976 | Niguette, III | 340/172.5 |
| 3,967,247 | 6/1976 | Andersen | 364/200 |
| 4,164,787 | 8/1979 | Aranguren | 364/200 |
| 4,298,929 | 11/1981 | Capozzi | 364/200 |
| 4,392,200 | 7/1983 | Arulpragasam et al. | 364/200 |
| 4,394,731 | 7/1983 | Flusche et al. | 364/200 |
| 4,399,503 | 8/1983 | Hawley | 364/200 |
| 4,442,487 | 4/1984 | Fletcher et al. | 364/200 |
| 4,443,846 | 4/1984 | Adcock | 364/200 |
| 4,445,174 | 4/1984 | Fletcher | 364/200 |
| 4,464,712 | 8/1984 | Fletcher | 364/200 |
| 4,466,059 | 8/1984 | Bastian et al. | 364/200 |
| 4,484,267 | 11/1984 | Fletcher | 364/200 |
| 4,503,497 | 3/1985 | Krygowski et al. | 364/200 |
| 4,520,441 | 5/1985 | Bandoh et al. | 364/200 |
| 4,622,631 | 11/1986 | Frank et al. | 364/200 |

FOREIGN PATENT DOCUMENTS

0149392 7/1985 European Pat. Off. .

OTHER PUBLICATIONS

IBM Technical Disclosure Bulletin, Fletcher et al., vol. 25, No. 9, p. 4522 (Feb. 1983).
IBM Technical Disclosure Bulletin, Sparacio, vol. 21, No. 6, p. 2468 (Nov. 1978).
IBM Technical Disclosure Bulletin, Knight et al., vol. 27, No. 2, p. 1073 (Jul. 1984).
Ditzel et al., "Register Allocation For Free: The C Machine Stact Cache" Proc. AMC Symposium on Arch. Support of Programming Languages & Operating Systems, p. 48 (1982).
Badel et al., "Performance Evaluation of a Cache Memory For a Mini-Computer" Proc. 4th Inter. Symposium on Modelling & Performance Evaluation of Computers, p. 431 (1979).
A. Smith, "Characterizing the Storage Process & Its Effect on the Update of Main Memory by Write Through", J.ACM, vol. 26, No. 1, p. 6 (1979).

Primary Examiner—David Y. Eng
Attorney, Agent, or Firm—Arthur J. Samodovitz; Pryor A. Garnett; David S. Romney

[57] ABSTRACT

A multiprocessor computer system has a common master storage and data/instruction caches for each processor. Separate buffer storage units for each processor read data from the processor in parallel with the caches, but write data to the master storage sequentially, as directed by a controller for the master storage.

7 Claims, 7 Drawing Sheets

| ENTRY 0 | ADDRESS | | | | | | | DATA | |
|---|---|---|---|---|---|---|---|---|---|
| | EFFECTIVE ADDRESS 1-25 | ABSOLUTE ADDRESS 4-25 | SEQUENCE BITS 0-7 | EOI | C | IM | S | DATA DW0 | WRITE FLAGS 0-7 |
| | | | | | | | | DATA DW1 | WRITE FLAGS 0-7 |
| | | | | | | | | DATA DW2 | WRITE FLAGS 0-7 |
| | | | | | | | | DATA DW3 | WRITE FLAGS 0-7 |
| | | | | | | | | DATA DW4 | WRITE FLAGS 0-7 |
| | | | | | | | | DATA DW5 | WRITE FLAGS 0-7 |
| | | | | | | | | DATA DW6 | WRITE FLAGS 0-7 |
| | | | | | | | | DATA DW7 | WRITE FLAGS 0-7 |
| ... | ... | ... | ... | ... | ... | ... | ... | ... | ... |
| ENTRY 7 | EFFECTIVE ADDRESS 1-25 | ABSOLUTE ADDRESS 4-25 | SEQUENCE BITS 0-7 | EOI | C | IM | S | DATA DW0 | WRITE FLAGS 0-7 |
| | | | | | | | | DATA DW1 | WRITE FLAGS 0-7 |
| | | | | | | | | DATA DW2 | WRITE FLAGS 0-7 |
| | | | | | | | | DATA DW3 | WRITE FLAGS 0-7 |
| | | | | | | | | DATA DW4 | WRITE FLAGS 0-7 |
| | | | | | | | | DATA DW5 | WRITE FLAGS 0-7 |
| | | | | | | | | DATA DW6 | WRITE FLAGS 0-7 |
| | | | | | | | | DATA DW7 | WRITE FLAGS 0-7 |

FIG. 5

| BIT 0 BYTE 0 | BIT 0 BYTE 1 | BIT 0 BYTE 2 | BIT 0 BYTE 3 | BIT 0 BYTE 4 | BIT 0 BYTE 5 | BIT 0 BYTE 6 | BIT 0 BYTE 7 | BYTE FLAGS | ONE PARITY BIT | ARRAY 0 |
|---|---|---|---|---|---|---|---|---|---|---|
| . | . | . | . | . | . | . | . | . | . | |
| . | . | . | . | . | . | . | . | . | . | |
| . | . | . | . | . | . | . | . | . | . | |
| . | . | . | . | . | . | . | . | . | . | |
| BIT P BYTE 0 | BIT P BYTE 1 | BIT P BYTE 2 | BIT P BYTE 3 | BIT P BYTE 4 | BIT P BYTE 5 | BIT P BYTE 6 | BIT P BYTE 7 | BYTE FLAGS | ONE PARITY BIT | ARRAY 8 |

STORE BUFFER APPARATUS IN A MULTIPROCESSOR SYSTEM

This application is a continuation-in-part of application Ser. No. 07/291,805, filed Dec. 29, 1988 now abandoned.

CROSS REFERENCE TO RELATED APPLICATIONS

This application incorporates by reference the disclosures of copending application Ser. No. 291,888 entitled "Cache Bypass Apparatus" filed on Dec. 29, 1988 concurrently now abandoned, herewith, copending and of application Ser. No. 159,016, entitled "Store Queue For A Tightly Coupled Multiple Processor Configuration With A Two-Level Cache Buffer Storage", filed Feb. 22, 1988 now U.S. Pat. No. 5,023,776.

BACKGROUND OF THE INVENTION

The present invention pertains to computing systems, and more particularly to a store buffer apparatus in an improved, high performance, multiprocessor or uniprocessor computer system.

In the design and development of computer systems, increasing emphasis is being placed on performance of such systems. The performance is very often a function of the technology used in manufacturing the integrated circuit chips which comprise the computer system. One such technology, new in the development of computer systems, is Complementary Metal Oxide Semiconductor (CMOS) technology. CMOS technology provides a greater degree of reliability, serviceability, and availability than seen before in prior computer systems, due mostly to a reduction in the physical number of chips which comprise the computer system. Since a scarcity of input/output pins on chips has been a problem with prior computer systems, a reduction in the number of chips reduces the number of interconnections (input/output pins) between chips In addition, performance may also be a function of the number of processors which comprise the computer system.

In such processors, master storage facilities store data needed by the central processor units (CPU). In a multiprocessor system, each processor often included a small cache memory in addition to the master storage facilities. The cache was used by a particular processor to store blocks of instructions or data. If the data or instructions were needed by the processor, a particular item of data or an instruction was retrieved from the cache in lieu of the master storage facility, since the time required to perform a fetch from cache is much smaller than the time required to fetch from master storage. However, if a particular processor retrieved data and/or instructions from cache and executed the instructions and/or operated on such data yielding a set of results which required storage in the master storage facility, it is necessary that the particular processor store the set of results directly to the master storage, not via the cache. However, if a first CPU of the multiprocessor system is using the master storage facility, a second CPU cannot store the set of results in the master storage facility until the first CPU is finished using the facility.

In a uniprocessor mode, the master storage facility can also be tied up by the channel facilities. This way the processor itself can not store the result back into the master storage facility until the master storage is freed up by the channel facilities Thus the processor can not execute the next instruction until the channel facilities finish using the master storage facility. Therefore, the execution of another instruction in the second CPU is delayed until the master storage facility is freed up by the first CPU or by the channel facilities.

Furthermore in a pipeline machine, the processor has the capability to store results back into the master storage facility every machine cycle. Usually the rate of storing data into the master storage facility is much slower than the rate the processor generates the data to be stored away. Hence the processor has to stop executing instructions while the master storage facility is still busy storing the result for the current instruction. In other words, the master storage facility can not keep up with the processor.

SUMMARY OF THE INVENTION

It is an object of the present invention to introduce an improved computer system which provides a high level of performance due to its use of a store buffer for temporarily holding data or instructions from the current CPU when the master storage facility is being utilized by the current CPU, or by another CPU, or by the channel facilities, thereby freeing up the current CPU for execution of other instructions.

In a multiprocessor system including at least two processors and a main memory, each processor includes a cache and a separate and distinct store buffer facility in accordance with the present invention. If one processor is using the master storage facility when the other processor seeks to store data in the master storage facility, in a multiprocessor system without a store buffer, the other processor is forced into a hold condition until such time that the one processor completes its use of master storage. When the one processor completes its use of the memory, the other processor may then begin the store operation. Valuable time is lost during the hold condition. However, in accordance with the present invention, a store buffer is incorporated into each processor in addition to its own cache. Therefore, when the other processor attempts to store data in master storage when master storage is being used by the one processor (or by the other processor or by the channel facilities), the other processor stores the data in its store buffer facility simultaneously with storage of the data in its cache. This store buffer acts to temporarily hold the data during the time when the master storage is being tied up by other resources. When the master storage is free, the data in the store buffer of the other processor is transmitted to master storage. The store buffer of each processor contains eight entries. Each entry includes an address portion comprising an effective address and an absolute address, a status bit portion comprising a plurality of status bits, and a data portion including data and a plurality of write flags. The status bits are used to determine if the data stored in an entry of the store buffer pertains to a current instruction or a previous instruction and whether or not the data has already been stored in main memory. Other status bits indicate whether the data in a particular entry pertains to a sequential store or a non-sequential store and indicate how many data entries pertain to one particular instruction. Whenever data is stored in a store buffer of a processor, all the status bits are set accordingly, that is, one bit is set to indicate if the data is associated with a present or a previous instruction, one bit is set to indicate whether the data has already been stored in master storage, and one bit is set to indicate if the store in the store buffer is made during sequential or non-sequential store mode. When conditions change within the processor, the status bits associated with a particular data entry in a store buffer are changed again. The store buffer is used during sequential and non-sequential store mode, during fetch conflicts for data and instructions, when a merge operation is required, when the contents of a store buffer is dumped into master storage, and during instruction retry situations.

DETAILED DESCRIPTION OF THE PREFERRED EMBODIMENT

Figure 1:
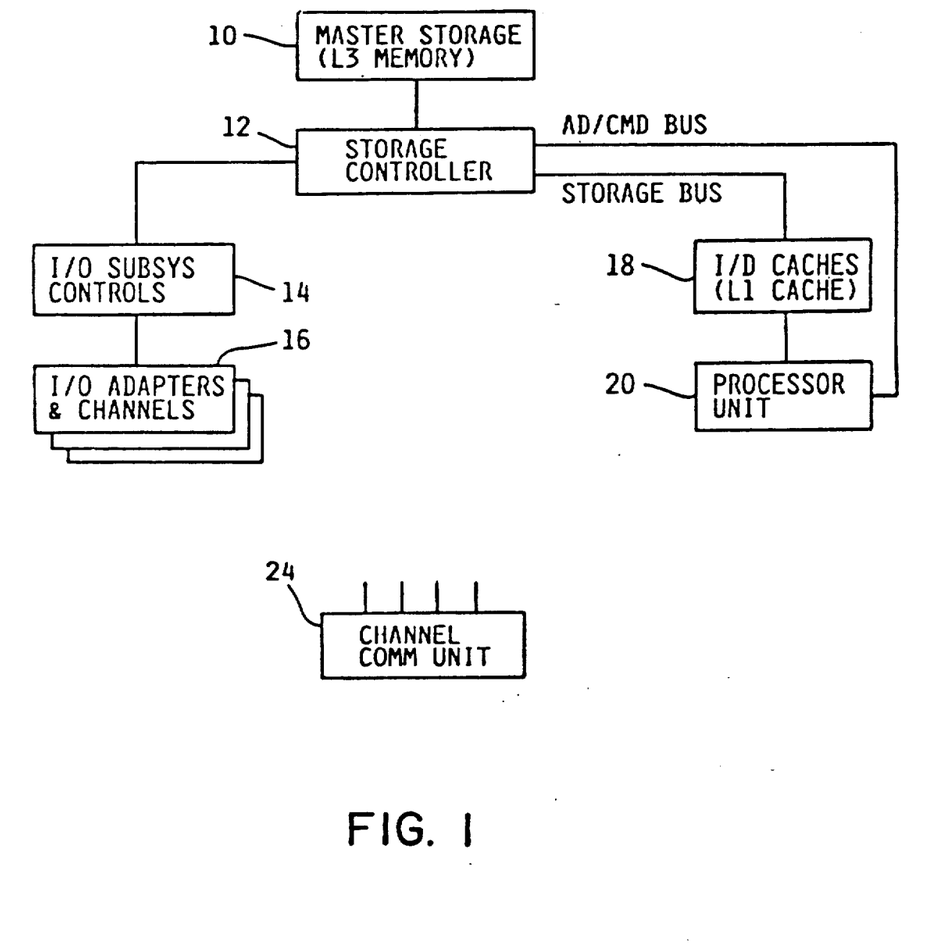
FIG. 1 illustrates a uniprocessor computer system.

FIG. 1 illustrates a prior-art uniprocessor computer system which may serve as an environment for the present invention.

In FIG. 1, the uniprocessor system comprises a main-storage or L3 memory 10 connected to a storage controller (SCL) 12. On one end, the storage controller 12 is connected to integrated I/0 subsystem controls 14, the controls 14 being connected to integrated adapters and single card channels 16. On the other end, the storage controller 12 is connected via storage bus 17 to a cache storage unit 18, which comprises an instruction cache and a data cache, collectively termed the L1 cache. The I/D caches 18 are connected to an instruction unit (I-unit), Execution unit (E-unit), and control store of a processor 20. The processor 20 is also connected to the storage controller 12 through the address/command (AD/CMD or A/C) bus 30. The uniprocessor system of FIG. 1 also includes the multisystem channel communication unit 24.

The L3 memory 10 comprises 2 intelligent memory cards. The cards are intelligent due to the existence of certain specific features: error checking and correction, extended error checking and correction (ECC) refresh address registers and counters, and bit spare capability. The interface to the L3 memory 10 is 8 bytes wide. Memory sizes are 8, 16, 32, and 64 megabytes. The L3 memory is connected to a storage controller (SCL) 12.

The storage controller 12 comprises three conventional bus arbiters for granting access to the L3 memory 10, to the I/0 subsystem controls 14, and to the I/D caches 18. The storage controller further includes a directory which is used to determine whether to invalidate the lines of the instruction and data caches of the L1 cache 18 for data. If the desired data is located in the L1 caches 18 but the data is obsolete, the storage controller 12 invalidates the obsolete data in the L1 caches 18, thereby allowing the I/0 subsystem controls 14 to update the data in the L3 memory 10. Thereafter, instruction and execution units 20 must obtain the updated data from the L3 memory 10. The storage controller 12 further includes a plurality of buffers for buffering data being input to L3 memory 10 from the I/0 subsystem controls 14 and for buffering data being input to L3 memory 10 from instruction/execution units 20. The buffer associated with the instruction/execution units 20 is a 256 byte line buffer which allows the building of entries 8 bytes at a time for certain types of instructions, such as sequential operations. This line buffer, when filled by all the data from one instruction, will cause a block transfer of data to L3 memory to occur. Therefore, memory operations are reduced from a number of individual store operations to a much smaller number of line transfers.

The instruction cache/data caches of unit 18 are each 16K byte caches. The storage bus 17 to the storage controller 12 is 8 bytes wide; thus, an in-page operation from the storage controller 12 takes 8 data transfer cycles. The data cache 18 is a "store through" cache, which means that data from the instruction/execution units 20 are stored in L3 memory and, if the corresponding obsolete data is not present in the L1 caches 18, the data is not brought into and stored in the L1 caches. To assist this operation, a "store buffer" is present with the L1 data cache 18 which is capable of buffering up to 8 store operations.

The integrated I/0 subsystem 14 is connected to the storage controller 12 via an 8-byte bus. The storage controller 12 comprises three 64-byte buffers used to synchronize data coming from the integrated I/0 subsystem 14. That is, the instruction/execution unit 20 and the I/0 subsystem 14 operate on different clocks, the synchronization of the two clocks being achieved by the three 64-byte buffer structure.

The multisystem channel communication unit 24 is a 4-port channel to channel adapter, packaged externally to the system.

The uniprocessor system of FIG. 1 operates as follows.

Normally, instructions are resident in the instruction cache (L1 cache) 18, waiting to be executed. The instruction/execution unit 20 searches a directory within the L1 cache 18 to determine if the next instruction is stored therein. If the instruction is not stored in the L1 cache 18, the instruction/execution unit 20 will generate a storage request to the storage controller 12. Both the absolute address of the instruction and the in-page request will be provided to the storage controller 12 through the AD/CMD bus 30. The storage controller 12 will arbitrate (according to a conventional algorithm) for access to the bus connected to the L3 memory 10. Eventually, the in-page request and the absolute address from the instruction/execution unit 20 will be passed to the L3 memory 10, the request comprising a command indicating that an instruction in L3 memory is to be fetched for transfer to the instruction/execution unit 20. The L3 memory will latch the request and the absolute address, decode the request, and select the location in the memory card wherein the instruction is stored. After a few cycles of delay, the instruction will be delivered to the storage controller 12 from the L3 memory in 8-byte segments. The instruction is then transmitted from the storage controller 12 through storage bus 17 to the instruction cache (L1 cache) 18, wherein it is temporarily stored. The instruction is then transmitted from the instruction cache 18 to the instruction register within the instruction/execution unit 20.

The instruction is decoded via a conventional decoder within the instruction unit 20. Quite often, an operand from memory 10 is needed in order to execute the instruction. The instruction/execution unit 20 searches the directory in the data cache 18; if the operand is not found in the directory of the data cache 18, another storage access is issued by the instruction/execution unit 20 to access the L3 memory 10 via AD/CMD bus 30, exactly as described above with respect to the instruction cache. The operand is eventually sent back to the instruction/execution 20 for execution while at the same time it is stored back into the data cache 18. If the instruction/execution unit 20 decodes an I/O instruction in the instruction cache 18, information is stored in an auxiliary portion of L3 memory 10, sectioned off from instruction execution. The instruction/execution unit 20 informs the integrated I/0 subsystem 14 that such information is stored in L3 memory, and the subsystem 14 processors accesses the L3 memory 10 to fetch the information.

Figure 2:
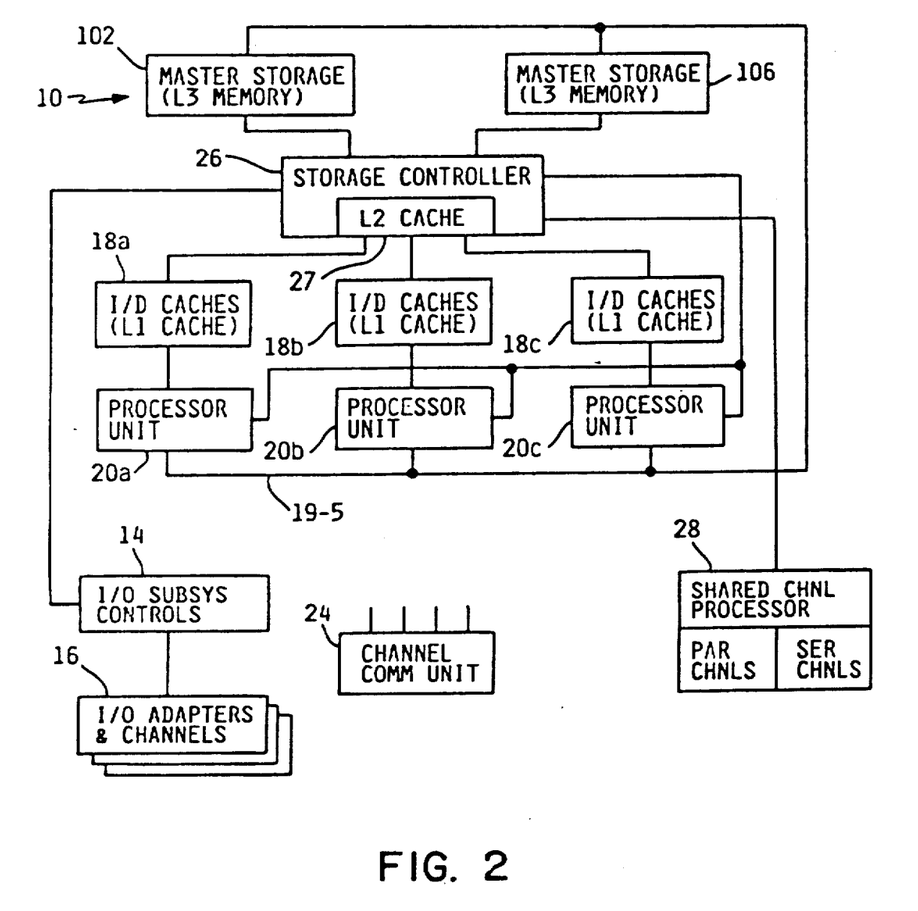
FIG. 2 illustrates a triadic computer system.

FIG. 2 shows a triadic (multiprocessor) system. Two L3 memories 10a,10b are connected to a bus switching unit (BSU) 26, the BSU including an L2 cache 27. The BSU 26 is connected to the integrated I/0 subsystem 14, to shared channel processors 28, and to three processor units: a first processor unit including instruction/execution units/control store 20a, a second processor including instruction/execution units/control store 20b, and a third processor including instruction/execution units/-control store 20c Each processor unit has an associated instruction/data L1 cache 18a, 18b, 18c. The cache in the BSU 26 is termed the L2 cache 27, and the main memory 10a/10b is termed the L3 memory.

The BSU 26 connects the three L1 caches 18a, 18b, 18c of the three processors 20a, 20b, 20c, two L3 memory ports 10a,10b, two shared channel processors 28, and an integrated I/0 subsystem 14. The BSU 26 comprises circuits which decide the priority for requests to be handled, such as storage requests from each of the three processors 20a-20c, requests from the I/0 subsystem 14 and shared channel processors 28, from circuits which operate the interfaces, and from circuits to access the L2 cache 27. The L2 cache 27 is a "store in" cache: when operations occur that access the L2 cache for data, and when that data is modified during the course of the operation, the data which is resident in the L2 cache must also be modified accordingly. (The only exception is that, if the operation originates from the I/0 subsystem 14, and if the data is resident only in L3 memory 10a,10b and not in L2 cache 27, the data is modified only in L3 memory, and not in L2 cache).

The interface between the BSU 26 and L3 memories 10a,10b comprises two 16-byte lines in lieu of the single 8-byte port in FIG. 1. However, the memory 10 of FIG. 1 is identical to the memory cards 10a,10b of FIG. 2. The two memory cards 10a,10b of FIG. 2 are accessed in parallel.

The shared-channel processor 28 is connected to the BSU 26 via two 8-byte ports. The shared channel processor 28 is operated at a frequency which is independent of the BSU 26; the clocks within the BSU are synchronized with the clocks in the shared channel processor 28 in a manner which is similar to the clock synchronization between the storage controller 12 and the integrated I/0 subsystem 14 of FIG. 1.

The multi-processor computer system of FIG. 2 operates in the following manner.

Assume that a particular instruction/execution unit, say 20a requires an instruction and searches its associated L1 cache, 18a for the desired instruction. Assume further that the desired instruction is not resident in the L1 cache. The instruction execution unit will then request access to the BSU 26 via AD/CMD bus 30a to search the directory of the L2 cache 27. The BSU 26 contains a conventional arbiter which receives requests from each of the instruction/execution units 20a, 20b, 20c and from the shared channel processor 28 and from the integrated I/0 subsystem 14, granting access to only one of these units at a time. When the particular instruction/execution unit 20a is granted access to the BSU to search the L2 cache 27, the BSU 26 searches the directory of the L2 cache 27 for the desired instruction. If the instruction is found in the L2 cache, it is returned to the instruction/execution unit 20a through storage bus 17a. If the L2 cache directory indicates that the desired instruction is not located within the L2 cache, a request is made to the L3 memory 10a or 10b for the desired instruction. If the desired instruction is located in the L3 memory, it is immediately transmitted to the BSU 26, 16 bytes at a time, and is bypassed to the requesting instruction/execution unit via storage bus 17a, while simultaneously being stored in the L2 cache 27 of the BSU 26. Additional functions of the BSU relate to storage consistency in a multiprocessor system. For example, when a particular instruction/execution unit such as 20c modifies data, that data must be made visible to all other instruction/execution units 20a, 20b in the system. If unit 20c modifies data presently stored in its L1 cache 18c, a search for that particular data is made in the L2 cache directory 27 of the BSU 26. If found, the particular data is modified to reflect the modification in the L1 cache 18c. Furthermore, the other processors 20a and 20b are permitted to see the modified, correct data now resident in the L2 cache 27 in order to permit such other processors to modify the corresponding data resident in their L1 caches 18a and 18b. The unit 20c cannot re-access the particular data until the other processors 20a and 20b have had a chance to modify their corresponding data accordingly.

Figure 3:
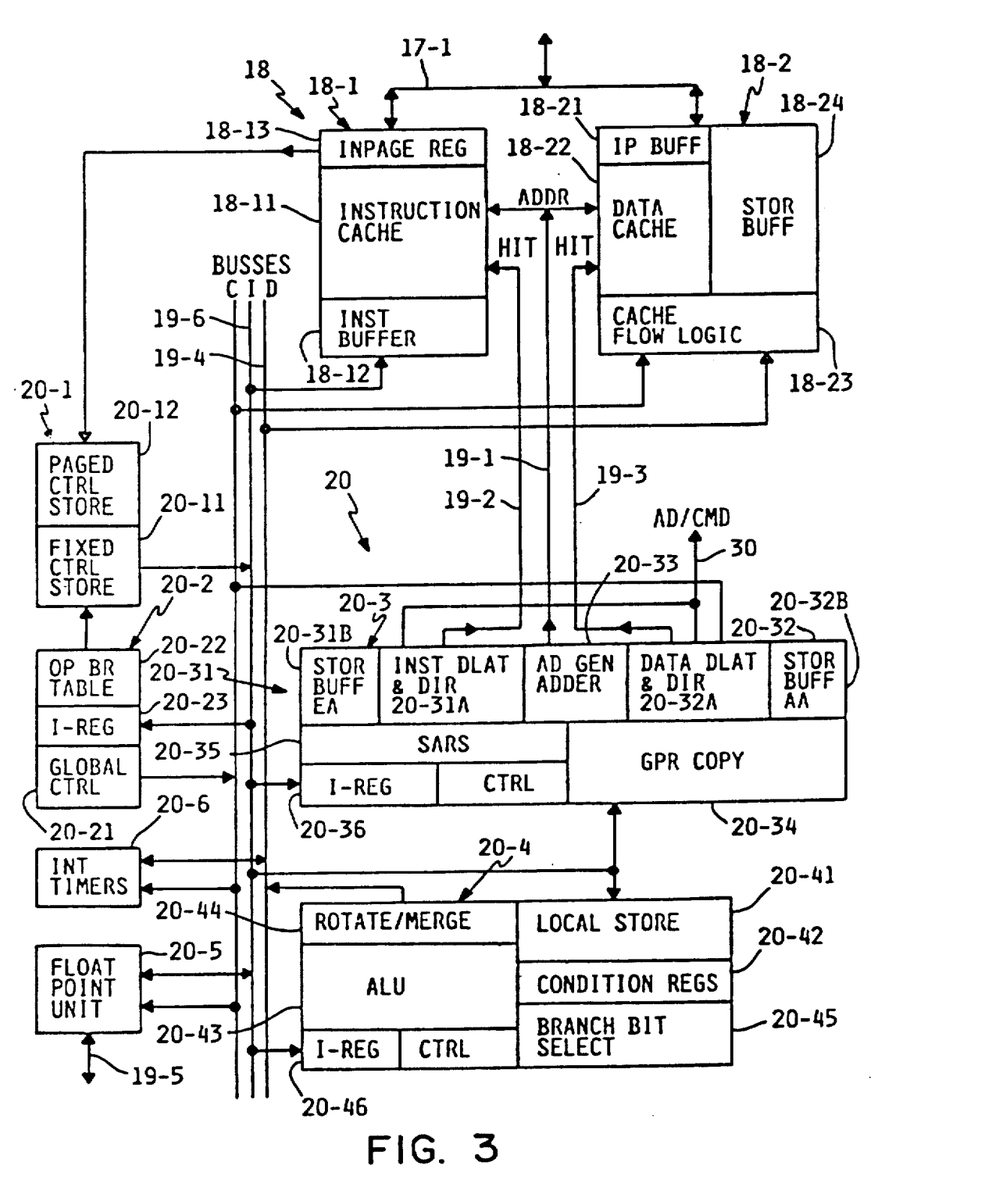
FIG. 3 illustrates a detailed construction of the I/D Caches 9 (L1), the I-unit, E-unit, and Control Store (C/S) illustrated in FIGS. 1 and 2.

FIG. 3 shows the detailed construction of each instruction/execution unit (20 in FIG. 1 or 20a-20c in FIG. 2) and its corresponding L1 cache (18 in FIG. 1 or 18a-18c in FIG. 2).

In FIG. 1, and in FIG. 2, the instruction/execution unit 20, 20a, 20b, and 20c is disposed in a block labelled "I-unit E-unit C/S (92KB)". This block may be termed the "processor", the "instruction processing unit", the "central processing unit (CPU)", or, as indicated above, the "instruction/execution unit". For the sake of simplicity in the description provided below, the block 20, 20a-20c will be called the "processor". In addition, the "I/D caches (L1)" will be called the "L1 cache".

FIG. 3 provides a detailed construction of the processor 20 (or 20a, 20b, 20c) and of the L1 cache 18 (or 18a, 18b, 18c).

The processor 20 comprises several elements. A control store subsystem 20.1 includes a high-speed fixed control store 20.11 of 84k bytes and an 8k byte, 2k word, 4-way associative pageable area 20.12. Machine state controls 20.2 include the global controls 20.21 for the processor, an op branch table 20.22 connected to the CSAR via the control store origin address bus and used to generate the initial address for microcoded instructions. An address generation unit 20.3 comprises 3 chips: an instruction cache DLAT and directory chip 20.31, a data cache DLAT and directory chip 20.32, and an address generation chip 20.33 connected to the L1 cache 18 via the address bus 19.1. The instruction DLAT and directory chip 20.31 is connected to the instruction cache portion 18.11 of the L1 cache 18 via four "hit" lines 19.2 which indicate that the requested instruction will be found in the instruction cache portion 18.11 of the L1 cache. Likewise, four "hit" lines 19.3 connect the data DLAT and directory 20.32 to the data cache 18.22 portion of the L1 cache 18 indicating that the requested data will be found in the data cache 18.22 portion of the L1 cache.

Furthermore the instruction DLAT/Directory chip 20.31 contains the effective address portion and some status bits of the store buffer EA 20.31b. The data DLAT and Directory chip 30.32 contains the absolute address portion and all of the status bits of the store buffer AA 20.32b in accordance with the present invention. The address generation chip 20.3 contains copies 20.34 of the 16 general purpose registers used to generate addresses, and also includes three storage address registers (SARS) 20.35 used to provide addresses to the microcode for instruction execution. A fixed point instruction execution unit 20.4 is connected to the data cache 18.2 via the data bus (D-bus) 19.4. A local store stack (local store) 20.41 contains the 16 general-purpose registers mentioned above as well as a number of working registers used exclusively by the microcode. Condition registers 20.42 contain the results of a number of arithmetic and shift operations, and a condition code. Numeral 20.43 denotes a conventional four-byte arithmetic logic unit (ALU); 20.44 is an 8-byte rotate merge unit. Branch bit select hardware 20.45 allows the selection of bits from various registers to determine the direction of a branch operation; the bits are selected from general purpose registers, working registers, and the condition registers. A floating-point unit 20.5 executes floating-point instructions. The floating point processor 20.5 is disclosed in pending patent application Ser. No. 102,985, entitled "Dynamic Multiple Instruction Stream Multiple Data Multiple Pipeline Apparatus for Floating Point Single Instruction Stream Single Data Architectures", filed on Sep. 30, 1987. The ALU 20.43 contains an adder as disclosed in pending patent application Ser. No. 066,580, filed Jun. 26, 1987, entitled "A High Performance Parallel Binary Byte Adder". An externals chip 20.6 includes timers and interrupt hardware for interrupts from the I/0 subsystem 14 and other units.

In an L1 cache 18, an instruction cache 18.1 comprises a 16k byte/4-way cache 18.11, a 16-byte instruction buffer 18.12 at the output thereof, and an 8-byte in-page register 18.13 at the input 17.1 from storage. The eight-bytes storage bus 17.1 is connected to the instruction cache 18.1 via the in-page register 18.13. The in-page register 18.13 is connected to the control store subsystem 20.1. It provides data to the subsystem when a pageable control store miss requires that new data be brought into the control store. A data cache 18.2 comprises an in-page buffer 18.21 also connected to the storage bus 17.1. The data cache 18.22 is a 16k-byte 4-way cache. A cache-dataflow unit 18.23 comprises a series of input and output registers connected to the processor via an 8-byte data bus (D-bus) 19.4, and an 8-element store buffer data 18.24 in accordance with the present invention.

The following describes the functional operation of one of the processors 20a–20c operating in conjunction with its associated L1 cache, 18a, 18b, or 18c.

Assume that an instruction to be executed is located in the instruction cache 18.11. The instruction is fetched from the instruction cache 18.11 and is stored in the instruction buffer 18.12. Every attempt is made to keep the instruction buffer full at all times. The instruction is fetched from the instruction buffer 18.12 and is stored in the instruction registers (INSTR REG) 20.36 of the address-generation unit 20.3, registers 20.46 of the fixed-point execution unit 20.4, and registers 20.23 of the machine-state controls 20.2. At this point, the instruction decoding begins. If one or more operands are required, they are fetched from the GPR COPY 20.34 in the address generation unit 20.3. (Normally, GPR COPY 20.34 is accessed if operands are required for the base and index registers for an RX instruction.)

The address generation process begins in the next cycle. The base and index register contents are added to a displacement field from the instruction, and the effective address is generated and sent to the data cache 18.2 and/or to the instruction cache 18.1. In this example, an operand is sought, so the effective address will be sent to the data cache 18.2. The address is also sent to the data DLAT and directory chip 20.32, since, in this example, an operand is sought. Access to the cache, DLAT, and the directories begins in the third cycle. The DLAT 20.32a determines if the address is translatable from an effective address to an absolute address. Assuming that this translation has been previously performed, it will have been recorded. The translated address from the DLAT output is compared with the output of the cache directory 20.32a. If they are equal, the data DLAT and directory chip 20.32 raises one of the four "hit" lines 19.3. The hit lines are connected to the data cache 18.22; a "hit" line indicates which of the four associativity classes contains the data that the processor 20 wishes to retrieve. On the next cycle, the data-cache 18.22 output is gated through a fetch alignment shifter, in the cache dataflow 18.23. It is shifted appropriately, transmitted along the D-BUS 19.4 to the fixed point execution unit 20.4, and latched into the ALU 20.43. In parallel with the shifting process, the first operand is accessed from the general-purpose registers in local store 20.41. As a result, two operands are latched in the input of the ALU 20.43, if necessary. In the fifth cycle, the ALU 20.43 will process (add, subtract, divide, etc.) the two operands according to the instruction opcode. The output of the ALU 20.43 and the condition registers 20.42 are latched at the end of the fifth cycle, to indicate an overflow or zero condition. In the sixth cycle, the output of the ALU 20.43 is written back into the local store 20.41 and into the GPR copy 20.34 of the address generation unit 20.3 in order to keep the GPR copy 20.34 synchronized with the content of the local store 20.41. When the decode cycle of this instruction is complete, the decode cycle of the next instruction may begin. Up to six instructions may be either decoding or executing at any one time. Certain instructions require the use of microcode to complete execution. Therefore, during the decode cycle, the op-branch table 20.22 is searched, using the opcode from the instruction as an address; the op-branch table provides the beginning address of the microcode routine needed to execute the instruction. These instructions, as well as others, require more than one cycle to execute. Therefore, instruction decoding is suspended while the op-branch table is being searched. Microcode uses the I-BUS 19.6 to provide microinstructions to the decoding hardware. The instruction cache 18.11 is shut off, the control store 20.11 is turned on, and the microinstructions are passed over the I-BUS 19.6. For floating-point instructions, decoding proceeds as previously described, except that, during the address generation cycle, a command is sent to the floating-point unit 20.5 to indicate and identify the proper operation to perform. In an RX floating-point instruction, for example, an operand is fetched from the data cache 18.22, as described above, and the operand is transmitted to the floating point processor 20.5 instead of to the fixed-point processor 20.4. Execution of the floating-point instruction then commences. When complete, the results of the execution are returned to the fixed-point execution unit 20.4; the results include a condition code, and any interrupt conditions, such as overflow.

The following paragraph describes the functional operation of FIG. 3, emphasizing the pipelined nature of the apparatus.

The first stage of the pipeline is instruction decode. For an RX instruction, where one operand is in memory, the base and index register contents must be obtained from the GPR COPY 20.34. A displacement field is added to the base and index registers. At the beginning of the next clock cycle, the base, index, and displacement fields are summed together to yield an effective address. The effective address is sent to the data DLAT and Directory chip 20.32. The high-order portion of the effective address is translated, but the low order portion is not translated and is sent to the cache 18.22. In the third cycle, the cache begins an access operation, using the bits it has obtained. The DLAT from data DLAT & Directory unit 20.32a is searched, using a virtual address to obtain an absolute address. This absolute address is compared with the absolute address kept in the cache directory from the data DLAT & Directory unit 20.32a. If this compare is successful, a "hit" line 19.3 is generated and sent to the cache chip 18.22. Meanwhile, the cache chip has accessed all four associativity classes and latched an output up all four slots of data in cache flow logic 18.23. In the fourth cycle, the data from one of the four slots or associativity classes is chosen, aligned, and then sent across the data bus 19.4 to one of the processors 20.4, 20.5. Therefore, at the end of the fourth cycle, one operand is latched in the input of ALU 20.43. Meanwhile, in the processor, other instructions are being executed. The GPR COPY 20.34 and the local store 20.41 are accessed to obtain the other operand. At this point, both operands are latched at the input of the ALU 20.43. One cycle is required to do the computation, set the condition registers, and finally write the result in the general purpose registers in the GPR COPY 20.34. The result may be needed, for address-computation purposes. Thus, the result would be input to the AGEN ADDER 20.33. During the execution of certain instructions, no access to the caches 18.11 and 18.22 is needed. In those cases, the results are passed directly to the execution unit when instruction decode is complete, without any access to the caches. Therefore, another instruction is decoded as soon as the previous instruction is decoded and passed to the address-generation unit 20.3.

Figure 4:
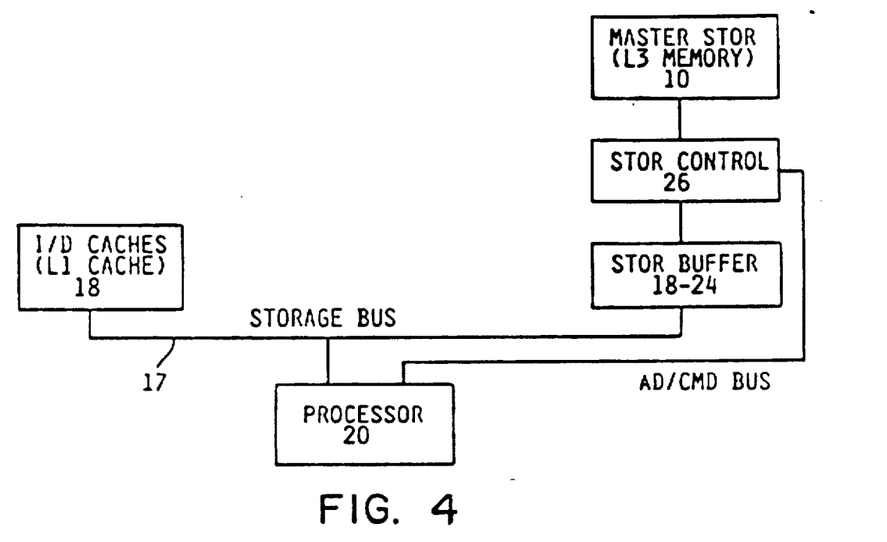
FIG. 4 illustrates a further configuration of the I-unit, E-unit, and Control Store (C/S) of FIGS. 1-3, further including a store buffer apparatus of the present invention.

FIG. 4 shows a system configuration including a processor unit 20 (or 20a, 20b, 20c); an I/D Cache 18 (or 18a, 18b, 18c); a storage controller 12 (or 26); the L3 master-storage memory 10 (or 10a, 10b); and the L1 store buffer 18.24, 20.31b, and 20.32b.

The store buffer data 18.24 is connected on one end to the storage controller 12 through storage bus 17 and on the other end to the processor unit 20. The storage controller 12 is then connected to the master storage (L3 memory) 10. The I/D cache (L1 cache) 18 is also connected to the processor unit 20. The store buffer AA 20.32b and store buffer EA 20.31b from processor 20 are connected to the storage controller 12 through AD/CMD bus 30.

Figure 5:
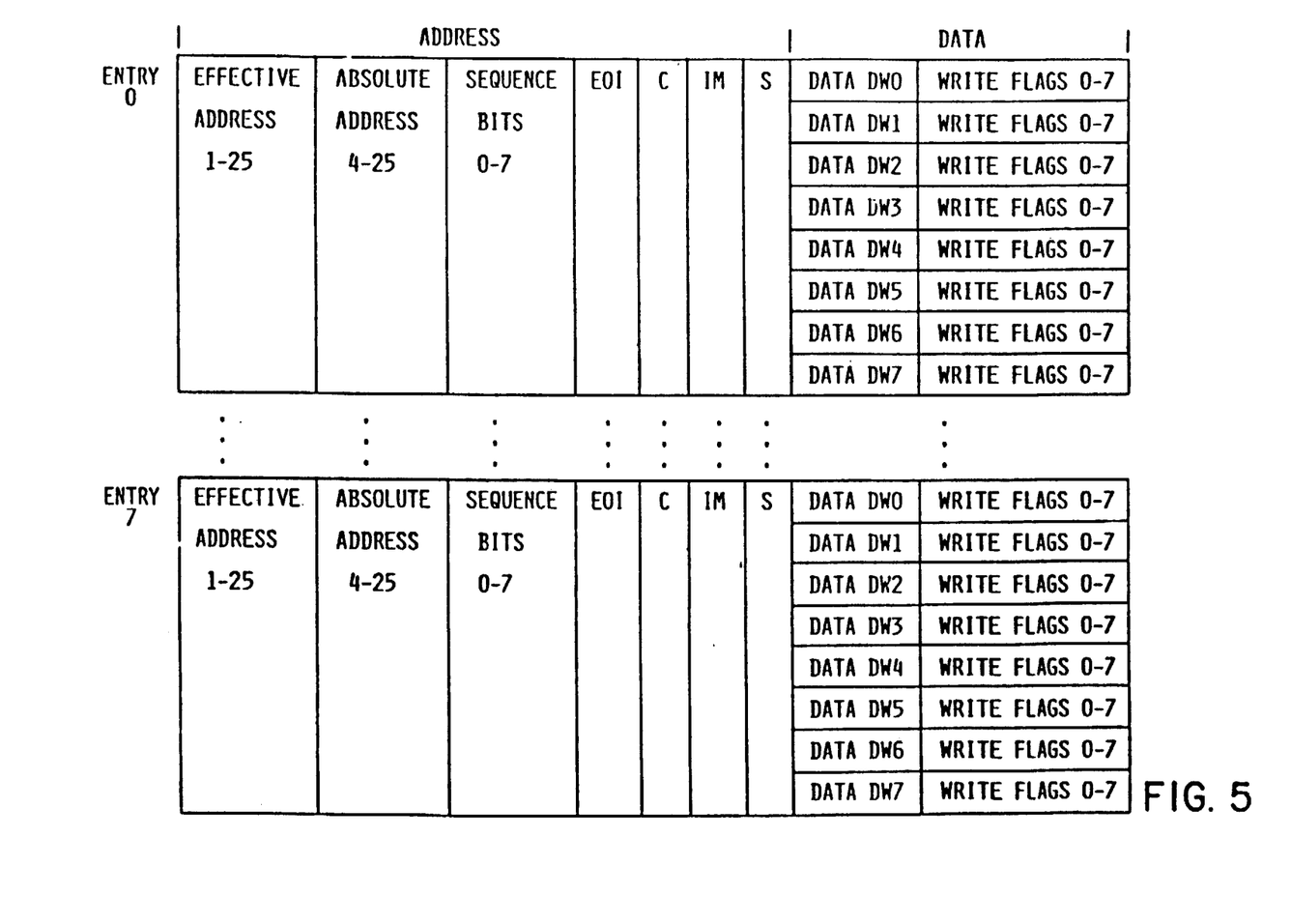
FIG. 5 illustrates the contents of the store buffer of FIG. 4.

FIG. 5 is a schematic of the contents of the store buffer (STOR BFR) 18.24, 30.31b, 20.32b of FIGS. 3 and 4.

The store buffer 18.24, 20.31b, 20.32b has eight entries, designated 0 through 7. Each entry includes effective address bits 1-25, absolute address bits 4-25, sequence bits 0-7, and end of instruction (EOI) bit, a complete (C) bit, an instruction mark (IM) bit, a sequential bit (S), data doublewords (DW) DW0-DW7, and eight write flags, bits 0-7.

Figure 6:
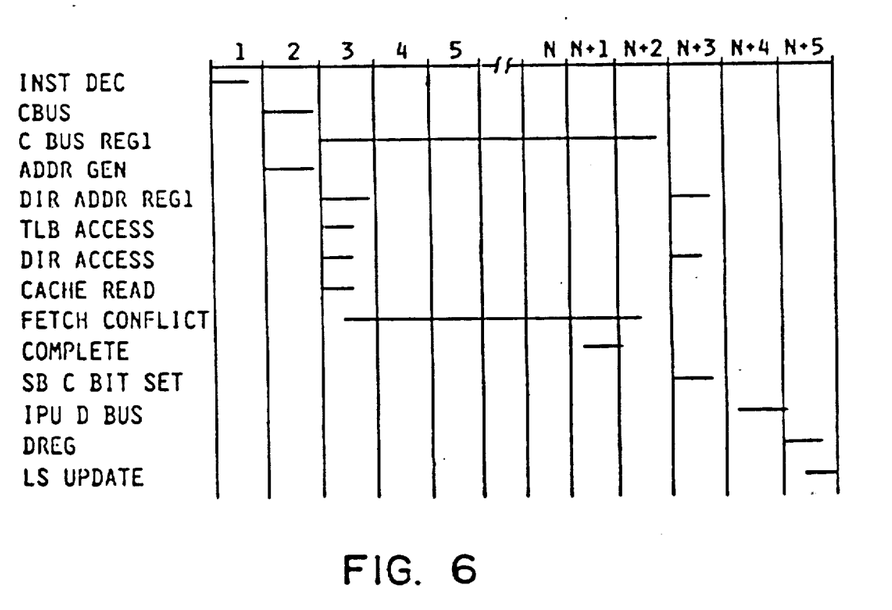
FIG. 6 illustrates a timing chart of a fetch conflict.
Figure 7:
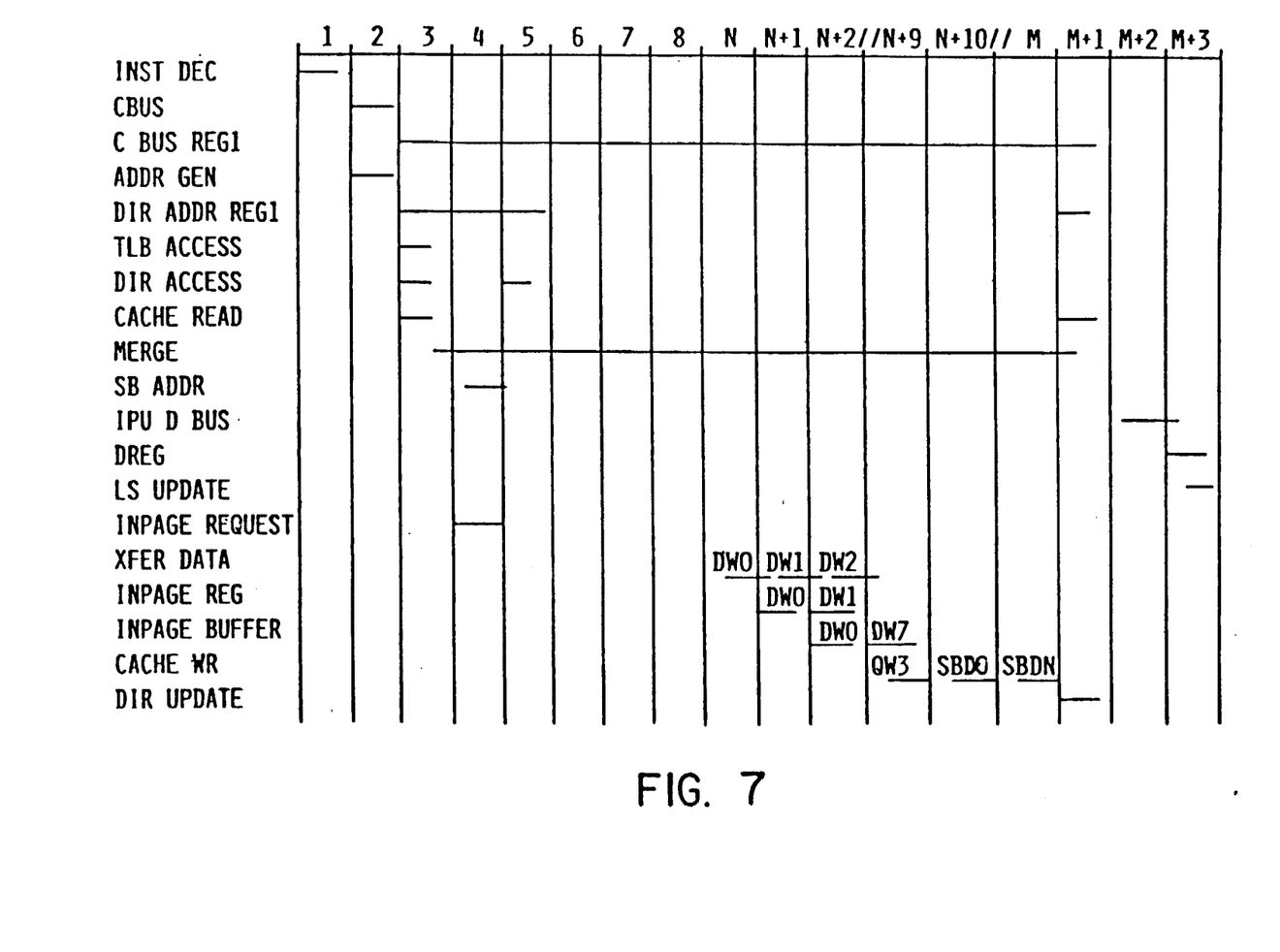
FIG. 7 illustrates a timing chart depicting an L1 cache miss with store buffer data merge.
Figure 8:
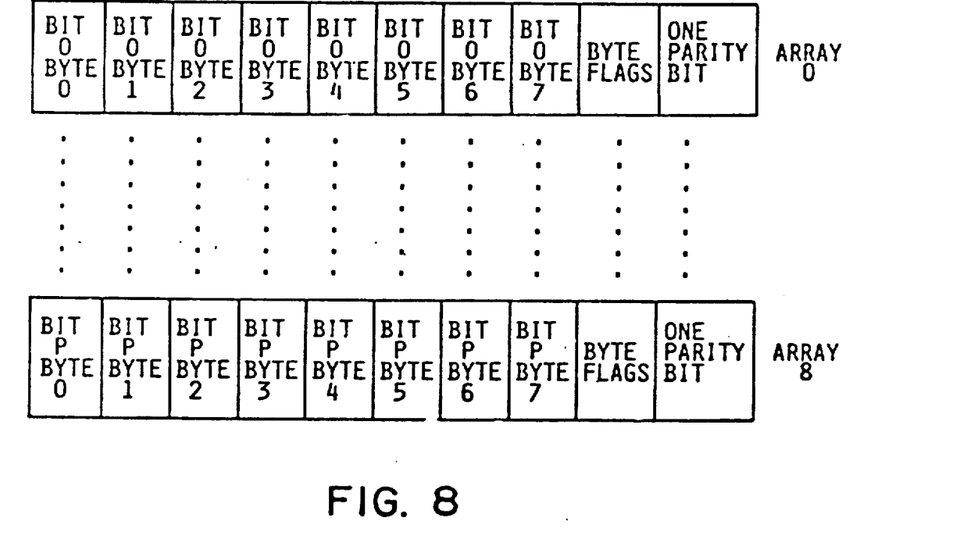
FIG. 8 illustrates the data portion of the store buffer.

FIG. 6 is a timing chart of a fetch conflict. FIG. 7 is a timing chart of an L1 cache miss with store buffer data merge. FIG. 8 shows a layout of the data portion of a store buffer entry. These figures will facilitate a functional description of the store buffer 18.24, 20.31b, 20.32b of the present invention, in the context of its use with the processor 20, the L1 cache 18, and the master storage 10, of FIGS. 4 and 5.

The L1 cache 18 is a store-through cache. In a store-through cache, the data to be stored in master storage 10 for each store made by the CPU is stored into the L1 cache 18 (if the "modified" line is resided in L1 cache); this data is also stored into the next level of storage, master storage 10 (via storage bus 17) regardless of whether or not the "modified" line is resided in the L1 cache 18. The master storage 10 is the level of storage which is visible to all processors. If the master storage 10 is tied up by one of multiple processors such as 20a-20c, or by the channel facilities such as I/O subsystem controls 14 or shared channel processor 28, then the store made by a second processor cannot be completed until the master storage 10 is available to this other processor. This will delay the second processor in the execution of its next instruction. To prevent this delay, the L1 store buffer 18.24, 20.31b, 20.32b temporarily holds the address and the data to be stored in master storage 10 by the second processor until such time that the master storage 10 is freed up by the first processor or by the channel facilities. When the master storage 10 is free, it is ready to store the second processor's data. Meanwhile, during the time when the second processor's data is being held by the store buffer 18.24, the second processor may continue to execute its next instruction.

Holding the address and data in the store buffers 18.24, 20.31b, 20.32b further improves performance even if the master storage 10 is free. This is because the processor 20 does not have to wait for the data actually to be stored into the master storage 10 before it can start to execute the next instruction.

Each of the eight entries in the store buffers 18.24, 20.31b, 20.32b can store eight DWs, and each entry is divided into two portions, an address portion 20.31b, 20.32b and a data portion 18.24. The address portion of each entry contains four sections. The first section houses the effective address, store buffer EA 20.31b, of the store address up to the line boundary, i.e., effective-address bits 1 to 25. The second section contains the absolute address, store buffer AA 20.32b, of the store address up to the line boundary, i.e., absolute-address bits 4 to 25. (High-order bits 1 to 3 of the absolute address are always zero, since the computer system of this embodiment supports a maximum of 256M bytes of main memory.) The third section, only found in store buffer AA 20.32b, contains the sequence bits 0 to 7.

Each sequence bit identifies which DW within the line boundary has been modified. The fourth section contains the four status bits. These four status bits are in both store buffer AA 20.32b and store buffer EA 20.31b. They are the End of Instruction bit (EOI), the Complete bit (C), the Instruction Mark bit (IM) and the Sequential bit (S). The EOI bit indicates whether the data in the store buffer data 18.24 is associated with the current or the previous instruction. If EOI = 1, the data for that entry belongs to the previous instruction, and is eligible to be stored away into the master storage 10. If EOI = 0, the data for that entry belongs to the current instruction and cannot yet be stored into the master storage 10, since page faults or access exceptions can occur for subsequent storage references within the same instructions. The C bit indicates, for those entries with EOI bit = 1, whether or not the data has been stored into the master storage 10. If C = 1, the data for that entry has been stored into the master storage 10. If the C = 0, the data for that entry has not yet been stored into the master storage 10. The IM bit indicates how many entries of data are associated with one instruction. The IM bit of the last entry of data for that instruction is always one; the IM bits for all other entries of the same instruction are zero. When the IM bit of an entry is one, the next entry belongs to another instruction. The S bit indicates whether or not the store-buffer data 18.24 entry contains a sequential store.

The data portion 18.24 of each entry contains two sections. The first section houses the eight DWs of the entry. The second section contains the eight write flags for each DW. The write flags indicate which byte within a DW has been modified. Each write flag corresponds to one byte of the eight bytes in a DW. If write flag 2 is on, byte 2 of that DW has been modified.

Whenever a processor 20a-20c makes a store to the L1 cache 18, the data, absolute address and effective address of that store are placed into the first available entry of the store buffer 18.24, 20.31b and 20.32b respectively. Address bits 26 to 28 indicate which DW is to store the data, and turn on the corresponding sequence bit in store buffer AA 20.32b. Address bits 29 to 31, and the length in bytes made by that store, generate the write flags in store buffer data 18.24. The EOI and C bits of both store buffer AA 20.32b and store buffer EA 20.31b for that entry are set to zero. When a processor 20a-20c has finished executing that instruction (at ENDOP), the EOI for that entry will be reset to one; the data for that entry can then be stored into the master storage 10. Once the master storage 10 has finished storing the data, the C bit is reset to one. The first store for each instruction uses a new entry in the store buffers 18.24, 20.31b, 20.32b.

All processor stores can be divided into two categories: sequential and non-sequential. There is a sequential store bit (S) in the L1 cache 18 and in the address-generation unit 20.3. S = 1 means sequential and S = 0 means non-sequential. The S bit is controlled by microcode, and is always reset to one at ENDOP. All hardwired store operations in the computer system of the present invention are sequential stores. All microcode store operations can be either sequential or non-sequential stores by manipulating the S bit.

A sequential store within an instruction is defined as one or more stores from the processor 20 (or 20a-20c) made to the L1 cache 18, where the logical address of each store fits one of the following criteria:
 (1) The logical address for each store is consecutive to the logical address of the previous store, independent of the address boundary.
 (2) A store within DW (A) boundary is followed by a store within DW (A+1) boundary, where both DWs A and A+1 are within the same 64 byte boundary.
 (3) A series of stores has one byte at a time to the same DW, as long as no two-byte locations are the same within the DW.

A sequence of stores within a single instruction fills successive DWs in an entry. When the last DW (DW7) of the entry is filled with data, the first DW (DW0) of the next entry will be used to store the next piece of data. The worst case for a series of stores in sequential mode is a total of 256 bytes requiring up to five entries, if the starting address does not fall on a 64-byte boundary. In this case, the corresponding EOI, C and IM bits are set to zero as data are stored into each entry. When all 256 bytes of data have been stored into the five entries of the store buffer 18.24, the EOI bits for all five entries and the IM bit of the fifth entry are set to one at ENDOP time. When all 256 bytes of data have been later stored into the master storage 10, the C bits and IM bits for all five entries are reset to one. The 256 bytes of store in this example use a move-character instruction done in microcode mode. (In hardwired mode, the stores can only be sequential, and the maximum length is 64 bytes. Thus no more than two store buffer entries can be used in a single hardwired store.)

All stores that do not fit the criteria for sequential stores are non-sequential. In this mode, every store made by the processor will use up one entry of the store buffer 18.24, 20.31b, 20.32b as long as the store addresses do not cross a 64 byte boundary. So a maximum of eight stores can be made by the microcode within one instruction in non-sequential mode. However, for any store that does cross a 64 byte boundary, two entries of the store buffer are used: DW7 of one entry and DW0 of the next entry. For the worst case in non-sequential store mode, only four stores can be made within one instruction. The store buffer might therefore be filled up with non-sequential stores in the same System/370 instruction. Since the master storage 10 cannot store the data until the 370 instruction is finished, the store buffer is hung up. The store buffer resolves this condition by dumping its contents. An "unretriable" indication is set until the System/370 instruction finishes.

Another bit in the L1 cache 18 and the address generation unit 20.3 hardware influences how the store buffers 18.24, 20.31b, 20.32b function. The immediate store bit (I), and like the sequential bit, is controlled by microcode. I = 1 denotes immediate store mode; I = 0 denotes non-immediate store. At ENDOP time, the I bit is always set to zero by hardware. (When the I bit is set to one by microcode, then the S bit has no meaning.) When I = 1, every store operation stores one entry of the store buffer: the data is immediately stored to master storage 10 without waiting for ENDOP time. If the data for the store crosses a 64-byte boundary, it will take up two entries of the store buffer. Since the data is stored to master storage 10 and visible to other processors before completion of the instruction, subsequent storage references within the same instruction that caused a page fault or an access exception would be unretriable, and would cause processor damage. The microcode therefore does not turn on the immediate store bit when a subsequent storage access can cause a page fault or an exception.

Once an entry is made into a store buffer 18.24, 20.31b, 20.32b, the data and absolute address can be sent down to the storage controller 12 only if storage bus 17 is free. That means there is no in-page operation going on for Control Store, instruction cache or data cache. Otherwise the storage bus 17 will be tied up for data transfer during in-page operation. The store buffer AA 20.32b sends down the absolute address, EOI and S bits, and a store command to the storage controller 12 through the AD/CMD bus 30. At the same time, the store buffer data 18.24 will send down the doubleword and its associated byte flags to the storage controller 12 through the storage bus 17. After latching up the address, data, byte flags and the status bits, the storage controller 12 examines the EOI bit. If the EOI bit is one, the storage controller 12 can access the master storage 10 and store the data away. If the EOI bit is zero, the instruction is not complete yet and the data cannot be stored into master storage 10. In this case the storage controller 12 buffers the absolute address, data and the byte flags. The S bit instructs to the storage controller 12 how to access the master storage 10, for instructions with more than one transfer from store buffer AA 20.32b and store buffer data 18.24 to storage controller 12. For example, if there are two transfers from the store buffer AA 20.32b and store buffer data 18.24 to the storage controller 12, and if the EOI bit for the first transfer is zero and the EOI bit for the second transfer is one, and if the S bit is one, then the storage controller 12 must access the master storage 10 once to store the data from both transfers, since the data is stored in sequential mode. However, if the S bit is zero, then the storage controller 12 must access the master storage 10 twice to store the data from both transfers.

While all these operations are going on, the processor 20 can continue to execute instructions without regard as to when all the data items are actually stored into master storage 10. Whenever the storage controller 12 can access the master storage 10 to store away all the data for one instruction, it sends an indication to the store buffer AA 20.32band to the store buffer EA 20.31b. The status bits of store buffer AA 20.32b and store buffer EA 20.31b made by that instruction are reset, so that the buffers become reusable.

In immediate store mode, I=1 for every store made by the processor 20, the hardware forces EOI=1 as soon as the entry is made in store buffer AA 20.32b and in store buffer EA 20.31b, without waiting for ENDOP time. The storage controller 12 always sees EOI=1. when it receives the store command from store buffer AA 20.32b in immediate store mode. The storage controller 12 will then access the master storage 10 and store the data away. For this reason, the S bit is meaningless and the data is unretriable in immediate store mode.

Whenever a processor makes a store to the L1 cache 18, the data, absolute address and effective address are placed into the store buffers 18.24, 20.32b, and 20.31b respectively. The master storage 10 may be tied up by the channel facilities or by a second CPU in multiprocessor mode, and cannot yet store the data for the first CPU. Once the first CPU has stored the data and address into its store buffer 18.24, 20.32b, 20.31b, it starts to execute the next instruction. If a subsequent instruction happens to fetch the data which has just been stored into the store buffer data 18.24 but has not yet been stored into the master storage 10, the first processor has a fetch conflict: the first processor wants to fetch data which is not yet visible to the second processor. Whenever a processor fetches data from storage, the absolute address of the storage operand is always checked with the absolute address portion of the store buffer AA 20.32b entries whose EOI bits are one and whose C bits are zero. The checking is done down to the DW boundary with the sequence bits, from absolute address bits 4 to 28. If there is a match, then the L1 cache 18 has to wait until the matching store buffer AA 20.32b entry (or entries) whose C bits are zero are reset to one, when the data are stored into master storage. This must happen before data can be delivered back to the processor. A fetch conflict is only possible in a multiprocessor configuration.

FIG. 6 shows a timing chart of a fetch conflict. Up to this point, the discussion has concentrated on an L1 cache 18 hit. For an L1 cache miss, regardless of whether the system is operating in uniprocessor or multiprocessor mode, if there is a match in absolute address up to a 64-byte boundary for the storage operand, and if the corresponding matching store buffer AA 20.32b entry's EOI bits are one and C bits are zero (that is, if the fetch is part of a different instruction than that of the store), the L1 cache 18 has to wait until the C bits of the matching store buffer AA 20.32b entries are reset to one before it can begin to page in a line of data (64 bytes) from master storage 10. This is necessary to maintain data integrity. If a processor wants to fetch data and there is a match in absolute address for the storage operand, and if the matching store buffer AA 20.32b entry's EOI bit is zero and C bit is zero (that is, if the fetch and store operations are within the same instruction), no fetch conflict can occur as long as there is a L1 cache 18 hit; this is true in either uniprocessor or multiprocessor mode. In this case, an L1 cache 18 miss requires a store-buffer data 18.24 merge operation. Since the EOI bit is zero for the matching store buffer data 18.24 entry, data cannot be stored into master storage 10; thus, the master storage 10 does not yet have the modified data. The unmodified data is paged in from the master storage to the L1 cache 18; thereafter, data from the matching store buffer data 18.24 entry is merged into the L1 cache 18 line, and then is delivered back to the processor. (This store buffer data 18.24 merging operation with the L1 cache 18 line usually happens during execution of a Move-Character instruction with destructive overlap between the source and destination addresses of the move.) Once this instruction is finished, the copy in the affected L1 cache 18 line is exactly the same as the data in the master storage 10.

FIG. 7 is a timing chart of the store buffer data 18.24 merge. (No merge is performed for non-sequential stores, due to the complexity of the operation.) The old data is paged in and provided directly. However, the directory is not updated, forcing the next System/370 instruction using the data to page in. This page-in will update the page. (This situation only can occur in microcode mode.)

Cycle 3 of FIG. 6 shows a fetch conflict for an L1 cache hit, due to the matching of the fetch address and the address from one of the store buffer AA 20.32b entries. On cycle N+1, the COMPLETE signal from master storage 10 informs the L1 cache hardware that the data has actually been stored into the master storage 10. On cycle N+3, the C bit is reset to one; on cycle N+4, the data is delivered back to the processor through the D BUS 19.4, FIG. 3.

Cycle 3 of FIG. 7 shows a fetch conflict for an L1 cache miss. Because of the L1 cache 18 miss, the MERGE signal is active, and the C bit is zero. On cycle 4, the page in request is sent down to the master storage 10. On cycle N, the XFER DATA signal informs the L1 cache 18 that master storage 10 has valid data sent up to the L1 cache 18 for the page-in. On cycle N+9, all 64 bytes of data have been written into the L1 cache 18. The first doubleword of data from the store buffer data 18.24 is written into the cache line on cycle N+10. On cycle M, the last doubleword of data from the store buffer data 18.24 is written into the L1 cache line to complete the merge. The directory of that cache line is then updated on cycle M+1, and data is sent back to the processor on cycle M+2.

A fetch conflict can also occur for an instruction. Whenever a processor fetches an instruction from the instruction cache 12, the effective address of the prefetch instruction is checked against the effective-address portion of the store buffer EA 20.31b entries whose C bits are 0. The comparison is done down to the 64-byte boundary, i.e., for effective-address bits 1 to 25. If there is a match, and if the instruction fetch is an instruction cache hit, then the unmodified line of the L1 instruction cache 18 is invalidated as soon as the C bits of the matching store buffer EA 30.31b entries are set back to 1 upon request of the master storage 10. An instruction is delivered to the CPU from master storage 10 for execution, but via a page-in operation through the L1 instruction cache 18. For an L1 instruction cache miss case, the step of invalidating the cache line is skipped.

The store buffer 18.24, 20.31b, 20.32b must be emptied before the processor can perform certain serialized operations. Microcode can accomplish this by issuing a Dump Store Buffer command; all data from the store buffer data 18.24 are stored into the master storage 10 before any further storage operations take place, regardless of the EOI bits. At the completion of this operation, the EOI and C bits of all store buffer AA 20.32b and store buffer EA 20.31b entries are reset to one. Since some of the EOI bits may be zero before the execution of the Dump Store Buffer command, any subsequent storage operations which caused page faults or access exceptions will become unretriable. The L1 cache hardware 18 and the address generation unit 20.3 will also execute the Dump Store Buffer command automatically upon detection of eight non-sequential stores within a single instruction. This prevents the previously mentioned hang condition from occurring when trying to execute a ninth store operation. Again, this instruction becomes unretriable.

An instruction must be nullified or suppressed if it has any storage reference which causes a page fault or access exception. The L1 cache 18 and some of the store buffer 18.24, 20.31b, 20.32b entries may have been modified by the same instruction before a page fault or access exception had occurred. The EOI bit in store buffer AA 20.32b and store buffer EA 20.31b operate to restore the system back to a beginning state. All entries whose EOI bits are zero belong to the instruction which caused the page fault or access exception. Retry microcode ensures that data stored by previous instructions is already written into the master storage 10. This is done with a FLUSH operation that holds off the execution of all subsequent instructions until the data having EOI=1 has been stored in the master storage 10. The retry microcode uses a microinstruction to read out the absolute address and EOI bit of all entries from the store buffer AA 20.32b, one entry at a time. For those entries whose EOI bits are zero, the retry microcode uses the associated absolute address to invalidate the corresponding lines of L1 cache 18. Once the C bits are reset to one for those entries whose EOI bits are one, the only remaining entries are those whose EOI and C bits are both zero. Those entries can be disregarded, since they belong to the same instruction which caused the page fault or access exception. A Reset Store Buffer microinstruction resets the EOI and C bits of all entries to one.

The physical implementation of the address, sequence and status bits of store buffer AA 20.32b and store buffer EA 20.31b uses registers instead of arrays; during a fetch conflict, the specific condition which initiated the fetch conflict is compared against each of the entries in the store buffer AA 20.32b and store buffer EA 20.31b. Sequence and status bits also require separate registers in order to reset multiple entries in a single cycle.

When a store to a store buffer 18.24, 20.31b, 20.32b is required, a write pointer points to the entry to be written into the store buffer. This pointer increments from 0 to 7, then wraps around to 0. In sequential mode, the write pointer is not incremented until the System/370 instruction is over, or until the last byte of a 64-byte page has been written. In non-sequential mode, the write pointer is incremented for every store. Stores crossing a DW boundary are executed in the same store buffer entry, unless they cross a 64-byte boundary. Conditions such as as a TLB miss or an exception prevent a write operation to a store buffer 18.24, 20.31b, 20.32b from occurring. Hardwire stores causing a TLB miss are re-executed from the beginning of the System/370 instruction. Re-executed stores are disregarded until they reach the point that caused the TLB miss. The write pointer can reach an entry whose data is not yet written in the master storage 10. This is a store buffer full condition. In this state, no more stores are accepted until the data has been stored away in the master storage.

The data and absolute address saved in the store buffer data 18.24 and store buffer AA 20.32b are read and sent to the master storage 10. A read pointer points to the entry to be sent. A transfer is accomplished for every sequence bit; up to eight transfers can be made from one single store buffer data 18.24 and store buffer AA 20.32b entry. A mask is ANDed with the sequence bits from store buffer AA 20.32b to identify which DW is to be transferred. The mask is updated after each transfer. When the last transfer is done, the read pointer is incremented. Transfers to master storage 10 are stopped when only one transfer is pending and the EOI bit from store buffer AA 20.32 is not marked, or when the store buffer does not contain more data to be transferred.

Once the master storage 10 has stored away the data for one System/370 instruction, it sends an indication to the store buffer AA 20.32b and store buffer EA 20.31b. The status bits of these store buffers entries made by that instruction are reset, and become ready for reuse.

FIG. 8 illustrates the data portion of the Store Buffer array 18.24. The data portion is contained in a data cache 18.2 which has nine 64-by-12 bit dual-port memory arrays. The data is bit-sliced across the nine arrays so that each array contains one bit of a byte; that is, only eight bits of data are contained on each array. Three more bits contain the Byte write flags on each array, with three arrays containing only two byte flags. Each array also contains a parity bit for the whole array, so that the arrays themselves can be checked.

In FIG. 8, the P represents the parity bit of each byte. The data portion of the store buffer data 18.24 contains two 3-bit pointers that address the particular entry being used, one pointer for the write port, and another pointer for the read port. A secondary read pointer points to the double word currently being read in the entry. (No secondary write pointer is needed because this part of the store buffer data 18.24 address is the same as the double-word address 19.1 which comes from the CPU 20.) Each entry has two distinct registers that contain the beginning double word location (the starting address register) and the last double word location (the ending address register). When the first write to the store buffer data 18.24 occurs, the last three bits of the address location are stored into the starting address register and the ending address register.

For subsequent stores, the last three bits of the write address are stored in the ending address register until the entry changes; the starting address register remains the same as the first write-address location. Then, when the read pointer points to this entry, the starting address is loaded into the secondary read pointer, and is incremented every time a read occurs. The secondary pointer is always compared with the ending address register to determine whether all the data of this entry has been read out. That is, the pointer is matched against the contents of the ending address register; if there is a match, the read has occurred. Upon a match between the secondary read pointer and the ending address, the read pointer increments to the next entry, as long as the write pointer is not at the same entry. Another pointer in the data portion is the merge pointer. This pointer is similar to the read pointer except that it uses the merge address sent from the address portion to determine which entry to use. After the data is read from all the appropriate double words, the merge is done and the secondary read pointer is able to address the arrays. Dual-port arrays allow a read and a write to take place at the same time. The disadvantage of using these arrays is that a read-modify-write cannot be performed, because the read address is not guaranteed to be the same as the write address. This is not a problem except in cross-eight-byte stores and in move-character operations where more than one store is addressing the same double word. To avoid this problem, a merge register is used just before the arrays. On the first store to a double word, the data and the write flags are stored into the merge register as well as into the arrays. Should the following store address the same double word, the data stored previously are combined with the new data and placed in both the merge register and in the arrays. Each time data are stored, the write flags are updated to reflect the bytes that have been stored.

Having described a preferred embodiment thereof, we claim as our invention:

1. A cache system for transferring data to and from a processor, said system comprising:

a level two (L2) storage unit;

a level one (L1) cache coupled to said processor and to said L2 storage unit;

first means for writing data from said L2 storage unit to said L1 cache, and writing said data from said L1 cache to said processor;

a level one (L1) storage unit coupled to said processor and said L2 storage unit;

second means, responsive to a write request by said processor, for writing data from said processor to said L1 storage unit without first requiring contents of said L2 storage unit from an address associated with said write request be stored in said L1 cache or said L1 storage unit if said address is not currently represented in said L1 cache or said L1 storage unit, and subsequently writing said data from said L1 storage unit to said L2 storage unit, said second mean also writing said data to said L1 cache if said address is currently represented in said L1 cache; and status means, coupled t said L1 storage unit and responsive to a read request by said processor, for determining if said read request requires data that is stored in said L1 storage unit but has not yet been written from said L1 storage unit to said L2 storage unit, and if so, delaying said read request until the second writing means writes said data from said L1 storage unit to said L2 storage unit, and then causing said processor to a access said at a from said L1 cache if written in said L1 cache by said second means, without writing said data from said L2 storage unit to said L1 cache, if not, without said delay, causing said first means to write said data form said L1 cache to said processor if said data resides in said L1 cache or causing said first means to write said data from said L2 storage unit to said L1 cache and then from said L1 cache to said processor if said data did not reside in said L1 cache when said processor made said read request.

2. The system of claim 1 further comprising:

third means, coupled to said L2 storage unit and said status means, for controlling access to said L2 storage unit by other processors and other associated cache systems such that access to an address is granted when said L2 storage unit contains the latest data for said address but access is denied when said L1 storage unit but not said L2 storage unit contains the latest data for said address.

3. The system of claim 1 further comprising:

another L1 cache coupled to another processor and said L2 storage unit; and third means for writing data from said L2 storage unit to said other L1 cache, and writing said data from said other L1 cache to said other processor; and another L1 storage unit coupled to said other processor and said L2 storage unit; and fourth means, responsive to a writ request by said other processor, for writing dat from said other processor to said other L1 storage unit and subsequently writing said data from said other L1 storage unit to said L2 storage unit; and wherein said second means writes data form the associated L1 storage unit to said L2 storage unit when said first means, said third means or said fourth means is not writing to or reading from said L2 storage unit.

4. The system of claim 1 wherein said L2 storage unit is a second level cache.

5. The system of claim 4 wherein said second level cache is coupled to a main storage.

6. The system of claim 1 wherein said L1 storage unit is part of said L1 cache.

7. The system of claim 1 wherein said L2 storage unit is main storage.

* * * * *

UNITED STATES PATENT AND TRADEMARK OFFICE
CERTIFICATE OF CORRECTION

PATENT NO. : 5,202,972
DATED : April 13, 1993
INVENTOR(S) : Richard J. Gusefski et al.

It is certified that error appears in the above-identified patent and that said Letters Patent is hereby corrected as shown below:

```
Column 18, line 18, "mean" should be --means--.
Column 18, line 30, "at a" should be --data--.
Column 18, line 60, "writ" should be --write--.
Column 18, line 61, "dat" should be --data--.
```

Signed and Sealed this

Twenty-fifth Day of January, 1994

Attest:

BRUCE LEHMAN

*Attesting Officer*  *Commissioner of Patents and Trademarks*